United States Patent
Swaminathan et al.

(10) Patent No.: US 10,228,260 B2
(45) Date of Patent: Mar. 12, 2019

(54) INFOTAINMENT SYSTEM FOR RECOMMENDING A TASK DURING A TRAFFIC TRANSIT TIME

(71) Applicant: Visteon Global Technologies, Inc., Van Buren Township, MI (US)

(72) Inventors: Ganesan Swaminathan, Chennai (IN); Ashokkumar Vasarla, Chennai (IN); Vijaya Ramanuja, Chennai (IN); Venkatasubramanian Saminathan, Chennai (IN)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days.

(21) Appl. No.: 15/541,304

(22) PCT Filed: Dec. 31, 2015

(86) PCT No.: PCT/IB2015/060073
§ 371 (c)(1),
(2) Date: Jun. 30, 2017

(87) PCT Pub. No.: WO2016/108207
PCT Pub. Date: Jul. 7, 2016

(65) Prior Publication Data
US 2017/0370741 A1 Dec. 28, 2017

(30) Foreign Application Priority Data
Jan. 1, 2015 (IN) .................. 8/CHE/2015

(51) Int. Cl.
*H04W 4/60* (2018.01)
*G01C 21/26* (2006.01)
*G01C 21/34* (2006.01)
*G01C 21/36* (2006.01)
*G08G 1/0968* (2006.01)
*H04W 4/04* (2009.01)

(52) U.S. Cl.
CPC ......... *G01C 21/3492* (2013.01); *G01C 21/26* (2013.01); *G01C 21/3697* (2013.01); *G08G 1/096888* (2013.01); *H04W 4/046* (2013.01); *H04W 4/60* (2018.02)

(58) Field of Classification Search
CPC .................. B60K 2350/352; B60K 35/00
USPC .................. 340/438; 700/276; 701/465
See application file for complete search history.

(56) References Cited

U.S. PATENT DOCUMENTS 9,020,697 B2 * 4/2015 Ricci ............... H04W 48/04
701/36
2013/0038437 A1 2/2013 Talati et al.
2014/0027807 A1 1/2014 Tasaki et al.
2014/0180752 A1 6/2014 Kozloski et al.
2014/0309790 A1 10/2014 Ricci

* cited by examiner

*Primary Examiner* — Eric Blount
(74) *Attorney, Agent, or Firm* — Dickinson Wright PLLC

(57) ABSTRACT

A system and method for recommending one or more relevant tasks based on the two or more relevant information associated to the user and traffic. The proposed system and method retrieves all the possible information associated to the traffic and the user and consolidates the information to determine the relevant tasks based on the one or more criteria.

15 Claims, 4 Drawing Sheets

INFOTAINMENT SYSTEM FOR RECOMMENDING A TASK DURING A TRAFFIC TRANSIT TIME

CROSS-REFERENCE TO RELATED APPLICATIONS

This application is a 371 national phase entry of PCT/IB2015/060073, filed 31 Dec. 2015, which claims the benefit of Indian Patent Application No. 8/CHE/2015, filed 1 Jan. 2015, the contents of which are incorporated herein by reference for all purposes.

FIELD OF THE INVENTION

The present invention generally relates to a system and method for recommending one or more relevant tasks to the user during traffic transit time, and more particularly, but not exclusively, to a method and system for recommending one or more relevant tasks to the user based on the two or more relevant information such as estimated traffic transit time, context information of the user etc.

BACKGROUND OF THE INVENTION

Drivers in the ten most traffic-jammed cities of U.S. spent on average—47 hours—more than a typical working week—behind the wheels each year. And in 2011, Americans spent 5.5 billion hours sitting in traffic, wasting $121 billion in gas and personal time. And the statistics range from 45 mins for 3 km and up to 3 hrs for 12 kms across Asian countries. As it is an unavoidable non-productive activity that every driver/passenger bears. At present navigation assistance applications/devices give user information about the extent of traffic—slow moving, heavy etc., as an overlay on routes to destination chosen. This only allows the user to decide on a route with lesser traffic or a route that is much longer yet avoids traffic. Though this gives the user information on possible delay if taking the route, not all types of events causing congestion can be predicted and this does not help a user who is already stuck in traffic. Applications like Waze depend on users to report traffic incidents and related updates while Applications like Glympse go one step ahead by reporting user's current whereabouts and associated delays to a set of contacts for a fixed time as specified by user. But these are again only various ways of reporting traffic and delay associated but not means of engaging user when he is amidst congestion. Therefore drivers can only resort to using their mobile phone to either perform some chores over calls or play games or access/post social updates or simply listen to radio/music from their vehicle infotainment unit.

Owing to constraints on the kinds of content/interactions that a driver can access/perform in the infotainment unit, he/she resorts to using a smartphone directly to perform any task. While reaching out to their smartphones to perform intended activities seems like an easy option it comes with the following hassles—to alternate between mobile interaction and driving controls counts for heavy distraction, lack of knowledge of whether an initiated task on mobile can be completed without data loss or repetitive data entry.

Based on a study conducted on effects of traffic conditions on attitudes towards in-vehicle agents (instructive Vs informative)—
  Only in the context of light traffic participants preferred an instructive agent
  Agents that help drivers' performance by e.g. providing preparatory information when approaching stressful situations might be appreciated more than agents interfering with driving decisions 'on the spot'
  Providing preparatory information can decrease stress reactions and increase perceived control, self-efficacy and performance Therefore in light of the above discussion, there is a need to develop an infotainment unit of a vehicle to recommend one or more relevant and essential tasks to the user during traffic transit time.

SUMMARY OF THE INVENTION

The principle object of the present invention is to recommend one or more relevant tasks to the user to utilize/engage the traffic transit time. The system determines one or more relevant tasks based on the two or more relevant information associated to the user and the traffic. The relevant information includes but not limited to traffic transit time, list of previous tasks completed during the traffic transit time and the context information of the user.

The present invention utilizes a predicted/measured traffic type and duration as triggers for the in-vehicle infotainment unit to recommend context relevant content to driver/user and facilitate safe interaction by eliminating the need to reach out to their smartphones. The recommendations vary based on the idle time that current traffic type would give the user as well as the cognitive load that user can handle at that time.

BRIEF DESCRIPTION OF DRAWINGS

The advantages and features of the invention will become more clearly apparent from the following description which refers to the accompanying drawings given as non-restrictive examples only and in which.

DETAILED DESCRIPTION OP PREFERRED EMBODIMENTS

Some embodiments of this invention, illustrating all its features, will now be discussed in detail.

The following description is of exemplary embodiment of the invention only, and does not limit the scope, applicability or configuration of the invention. Rather, the following description is intended to provide a convenient illustration for implementing various embodiments of the invention. As will become apparent, various changes may be made in the function and arrangement of the structural/operational features described in these embodiments without departing from the scope of the invention as set forth herein. It should be appreciated that the description herein may be adapted to be employed with alternatively configured devices having different shaped, components, and the like and still fall within the scope of the present invention. Thus the detailed description herein is presented for purposes of illustration only and not of limitation.

Figure 1:
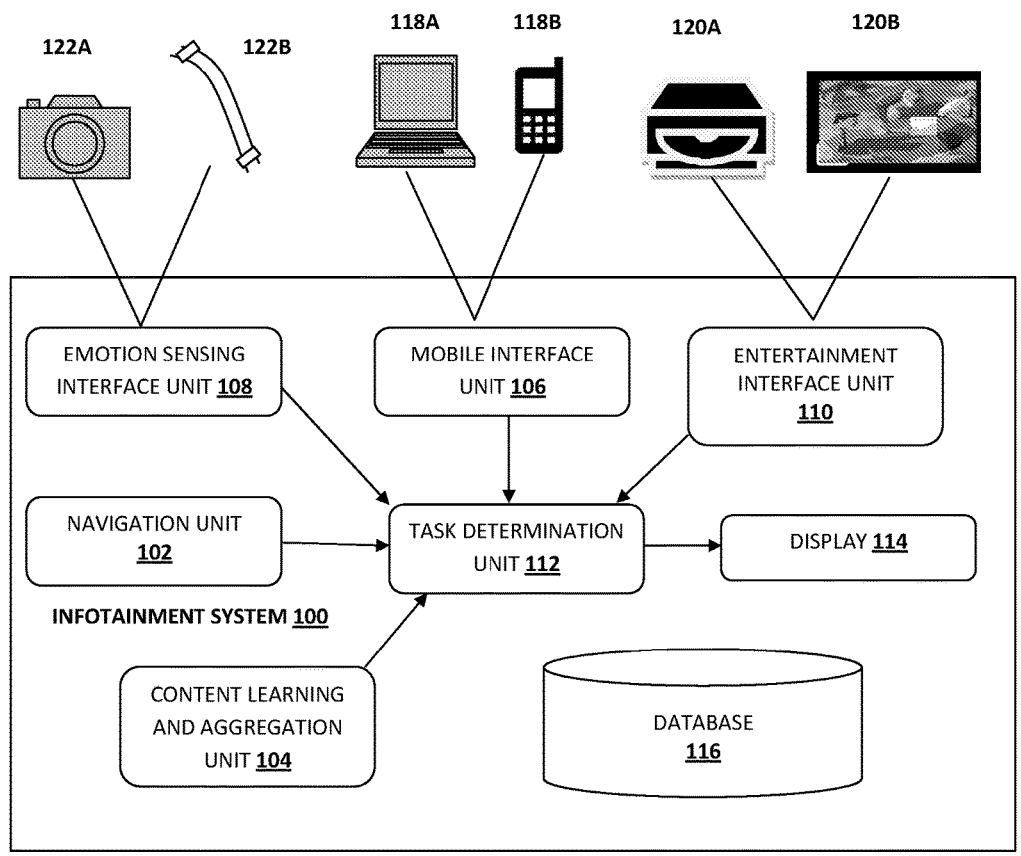
FIG. 1 illustrates a high level block diagram of an infotainment system for recommending one or more relevant tasks to user during a traffic transit time in accordance to one embodiment herein.

FIG. 1 illustrates a high level block diagram of an infotainment system 100 for recommending one or more relevant tasks to a user during a traffic transit time in accordance to one embodiment herein. The infotainment system 100 includes (i) a navigation unit 102 for receiving itinerary information from the user and obtaining a real time traffic information corresponds to the itinerary information, the itinerary information comprises a source and a destination, (ii) a content learning and aggregation unit 104 which stores one or more previous tasks performed by the user, a time stamp and time duration taken by the user to complete each of the one or more previous tasks, and the itinerary information associated therewith, (iii) a mobile interface unit 106 for obtaining one or more mobile tasks along with a time stamp for each of the one or more mobile tasks from a mobile device 118A-B, (iv) an emotion sensing interface unit 108 for detecting an emotion of the user, (v) an entertainment interface unit 110 for obtaining one or more entertainment related tasks form an entertainment device 120A-B, each of the one or more entertainment related tasks is tagged with at least one of the time stamp and the emotion, (vi) a task determination unit 112 for selecting the one or more relevant tasks from at least one of (a) the one or more mobile tasks, (b) the one or more entertainment related tasks and (c) the one or more previous tasks based on (1) the real time traffic information and at least one of (2) the itinerary information, (3) the time stamp and (4) the emotion of the user, when the vehicle approaching the traffic, and (vii) a display 114 for displaying the one or more relevant task to the user during traffic transit time and allowing the user to select and perform the task. The navigation unit 102 is a part of the infotainment system 100 which receives an input through input devices such as keyboard. In one embodiment, the display 114 of the infotainment system 100 may receive the input for the navigation unit 102. The infotainment system 100 also includes a database 116 which stores (i) the list of previous tasks and its time stamp and time duration information, (ii) map application and/or information required for navigation unit 102 and (iii) list of emotions and its characteristic information. The mobile interface unit 106 is configured to connect with one or more mobile devices 118A-B. The entertainment interface unit 110 is configured to connect with one or more entertainment devices 120A-B. The emotion sensing interface unit is configured to connect with one or more emotion sensing device 122A-B.

The mobile devices 118A-B is a Personal Digital Assistance (PDA) device which includes but not limited to a mobile phone, a laptop, a tablet computer. The one or more mobile tasks are defined in the PDA device along with the time stamp for each of the one or more mobile tasks. For example, the mobile tasks along with time stamp may be "pay the electricity bill on every $2^{nd}$ day of month". The emotion sensing interface unit 108 receives the emotion of the user from the emotion sensing device 122A-B. The emotion sensing device 122A-B includes but not limited to one of one or more devices which are worn by the user and an image capturing unit. One or more device includes but not limited to temperature sensor or heartbeat sensor fitted in the seat belt which can transfer the sensed parameters to the emotion sensing interface unit 108 of the infotainment system 100 wirelessly. The image capturing unit is a camera which is fitted in front of the user to capture the face emotion of the user. The entertainment device 120A-B is at least one of (i) a media player and (ii) a game player, and the entertainment device 120A-B storing the one or more entertainment related tasks along with the time stamp and the emotion. For example, the entertainment device 120A-B stores the entertainment related tasks such as "play the devotional songs at 6 AM". In another example, entertainment device 120A-B stores the task as "play the loud songs when I feel sleepy" and "play the melody songs when I feel stressed". The user's emotion "sleepy" is determined by the emotion sensing interface unit 108 using the image capturing unit and the database 116 i.e. the database stores an algorithm which process the image captured in the image capturing unit to identify the emotion of user whether it is sleepy. Similarly, the user's emotion "stressed" is determined by the heartbeat rate received from the heartbeat sensor fitted at the seatbelt.

The task determination unit 112 includes (A) a data collection module for receiving the real time traffic information from the navigation unit 102 and the one or more tasks from various unit of the infotainment system 100 which comprises (i) the one or more mobile tasks from the mobile interface unit 106, (ii) the one or more entertainment related tasks from the entertainment interface unit 110, (iii) the one or more previous tasks from the content aggregation and learning unit 104, (B) a task selection module for (a) identifying an exact traffic transit time from the real time traffic information obtained from the navigation unit 102 and (b) selecting one or more relevant tasks from the one or more tasks obtained in the data collection module that are suitable for the exact traffic transit time. The selection of one or more relevant tasks comprises (i) searching for the one or more relevant tasks from the one or more previous task which are completed in a duration of the exact traffic transit time, (ii) searching for the one or more relevant tasks from the one or more mobile tasks which are time stamped for a predefined duration which is equal to exact traffic transit time or one or more mobile tasks which are time stamped for the present day and +/−2 hours from the present time, and (iii) searching for the one or more relevant tasks from the one or more entertainment related tasks based on at least one of the time stamp for a present time and the emotion sensed in the emotion sensing device 122A-B. The task determination unit 112 further controls an environmental condition such as air-condition inside a vehicle based on the emotion.

The present embodiment utilize predicted/measured traffic type and duration as triggers for the in-vehicle infotainment unit 100 to recommend context relevant content to driver/user and facilitate safe interaction by eliminating the need to reach out to their smartphones. The recommendations vary based on the idle time that current traffic type would give the user as well as the cognitive load that user can handle at that time.

Figure 2:
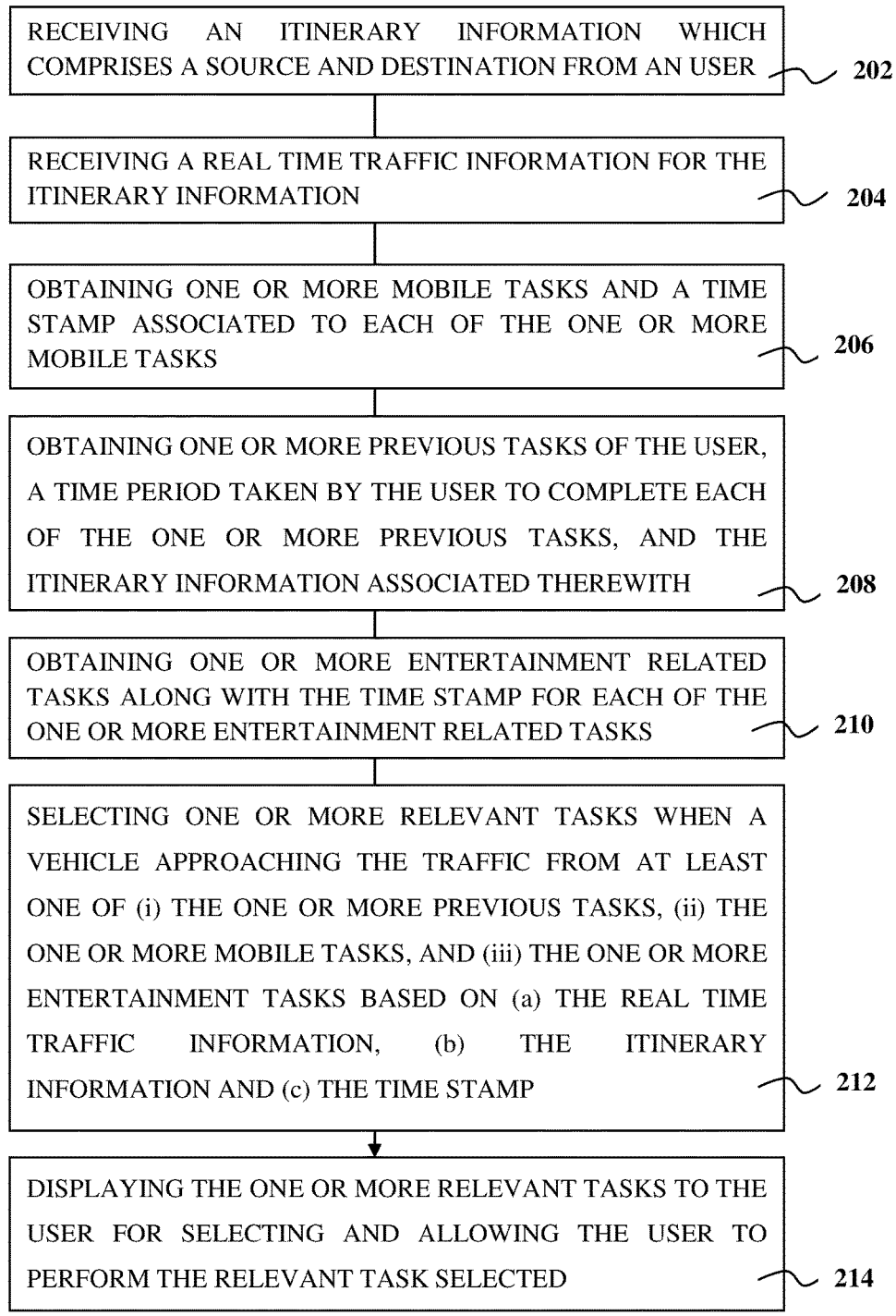
FIG. 2 illustrates a flow diagram for recommending one or more relevant tasks to the user during a traffic transit time by the infotainment system of FIG. 1 in accordance to one embodiment herein.
Figure 3:
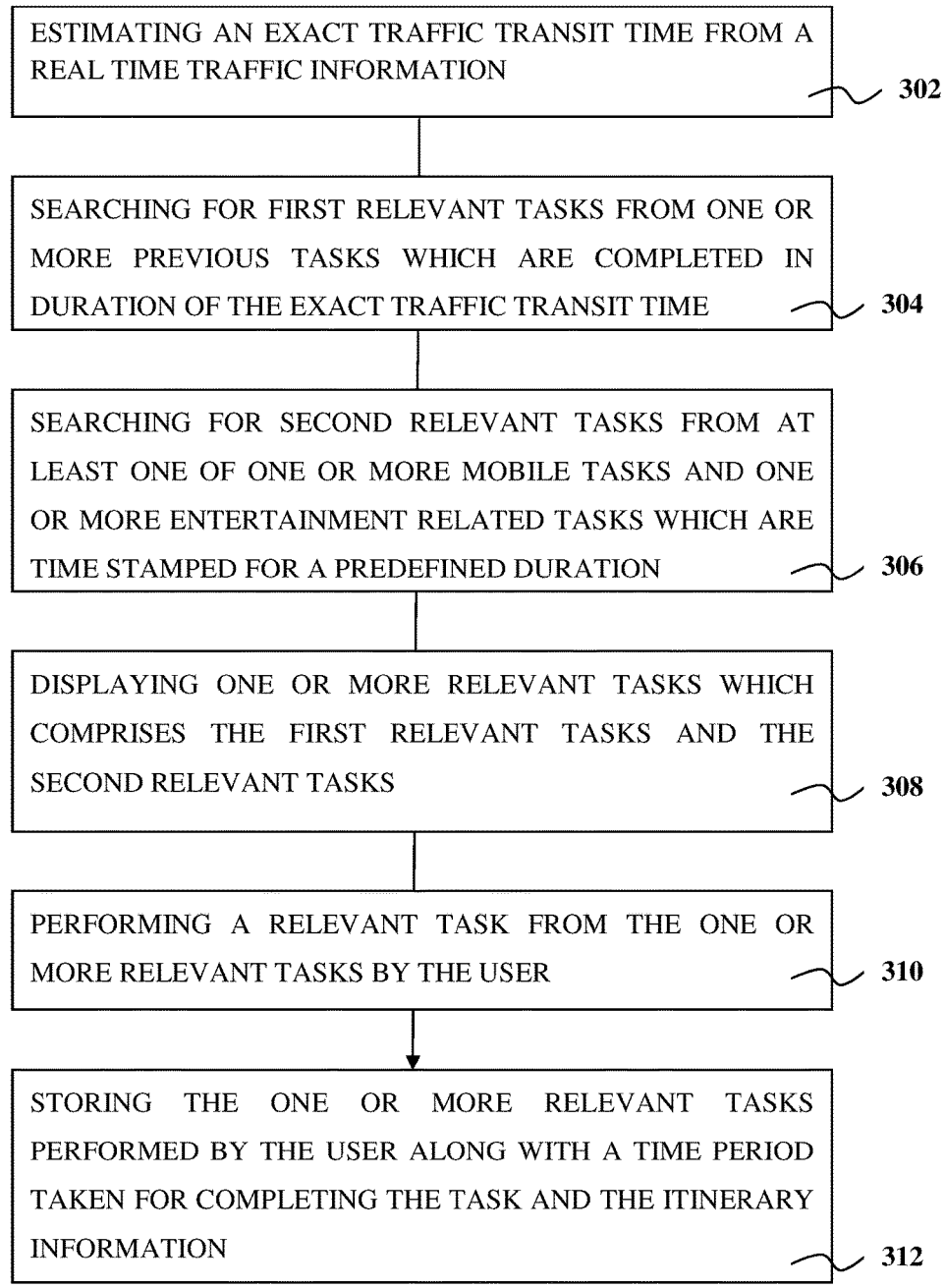
FIG. 3 illustrates a flow diagram for a method of selecting one or more relevant tasks from list of tasks obtained from various units of the infotainment system of FIG. 1 in accordance to first embodiment herein.
Figure 4:
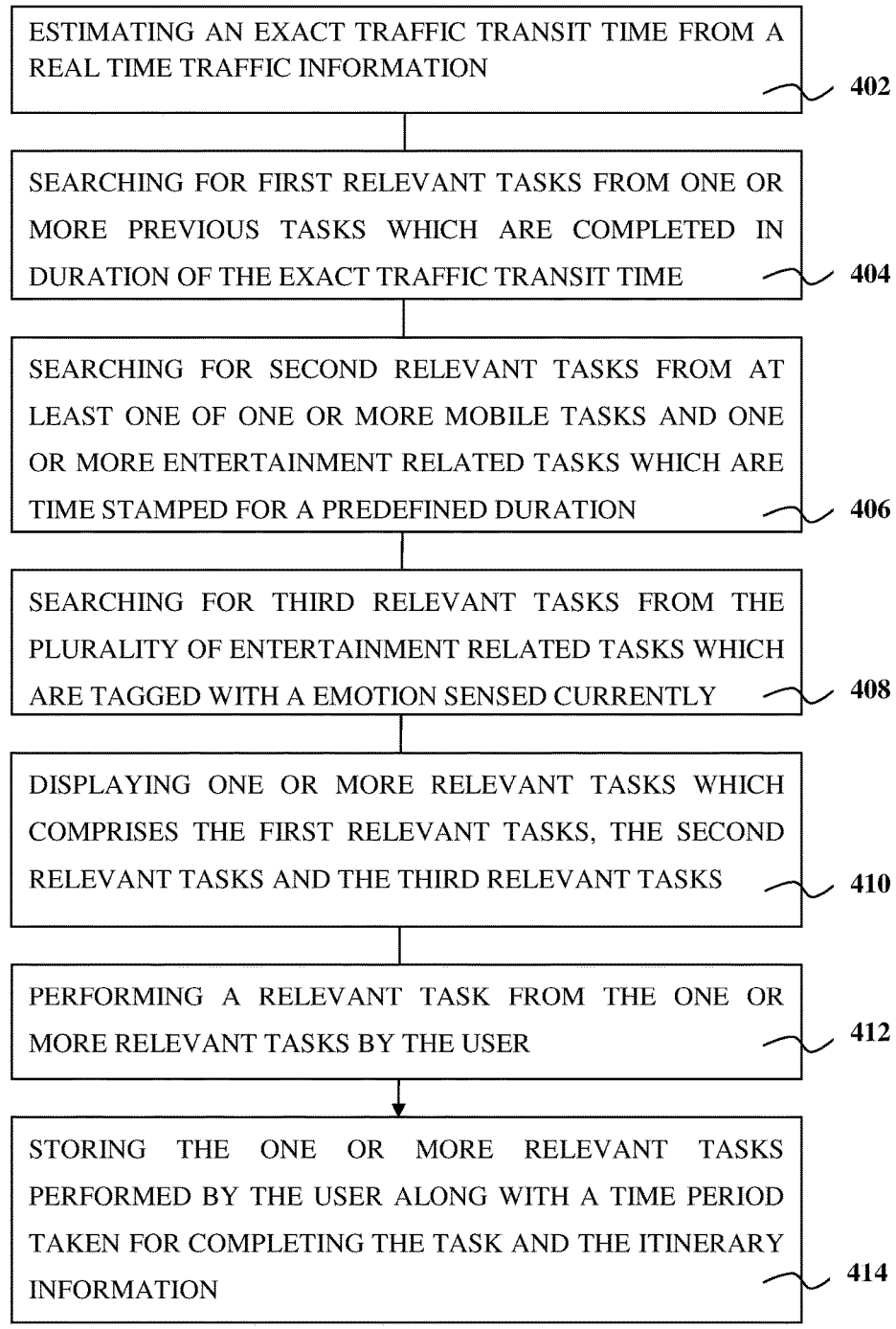
FIG. 4 illustrates a flow diagram for a method of selecting one or more relevant tasks from list of tasks obtained from the various units of the infotainment system of FIG. 1 in accordance to second embodiment herein.

Referring to FIG. 2, a method illustrates the recommending is described herein in greater detail. Specifically, the method includes the following steps: receiving (202) an itinerary information which comprises a source and destination from said user; receiving (204) a real time traffic information from a navigation unit for said itinerary information; obtaining (206) a plurality mobile tasks and a time stamp associated to each of said plurality of mobile tasks from a mobile device; obtaining (208) a plurality of previous tasks by said user, a time period taken by said user to complete each of said plurality of previous tasks, and said itinerary information associated therewith from a content learning and aggregation unit; obtaining (210) a plurality of entertainment related tasks along with said time stamp for each of said plurality of entertainment related tasks from an entertainment device; selecting (212) said one or more relevant tasks when a vehicle approaching the traffic from at least one of (i) said plurality of previous tasks, (ii) said plurality of mobile tasks, and (iii) said plurality of entertainment tasks based on (a) said real time traffic information, (b) said itinerary information and (c) said time stamp; and displaying (214) said one or more relevant tasks to said user during said traffic transit time in a display and allowing said user to perform said relevant task.

The content (i.e. one or more relevant tasks) for driver interaction could either be filtered from a to-do list of tasks (received from mobile device 118A-B and/or entertainment device 120A-B) explicitly created by user or it could be recommended based on learning from user routine and his/her smartphone usage patterns (received from content learning and aggregation unit 104). Kinds of content that user may be interested in can be broadly classified as— information, entertainment and productivity related. Therefore the present invention looks also at enabling driver to access kinds of data from in-vehicle infotainment unit which are otherwise not allowed while driving—including but limited to examples listed below i. information assimilation activities like (categorized and stored in the mobile device 118A-B)—monitoring one's stock portfolio performance to aid in informed buy/sell decisions, ii. entertaining activities (categorized stored in the entertainment device 120A-B) like—viewing videos/photos with file size suitable for current traffic duration/type as well as data network speed, playing games, browse/post social updates, access TV channel content, view action replays of ongoing sports events, solving trivia/puzzles, jokes, gossip-tid-bits, zodiac forecasts etc., iii. productive activities (categorized and stored in the mobile device 118A-B) like—completing chores such as phone/electricity bill payment, mobile phone/cable network recharges, dictating and creating a to-do list, making/postponing reservations ahead at the destination, viewing alternative activity/places of interest in current areas especially if traffic congestion is going to last for hours, schedule/reschedule household chores via appliances that are part of Internet of Things (IOT) network.

The below example illustrates how the infotainment system 100 of FIG. 1 works:

Before Drive

In one embodiment, the system 100 receives the itinerary information which includes source and destination and the path. Using the itinerary information the navigation unit 102 helps in planning with prediction of traffic and travel times—e.g—Actual Route "source-A-B-C-destination"—proposed route by the system "source-D-E-C-destination" to avoid traffic. (Works in sync with mobile app interface)

In another embodiment, the system 100 also obtains the list of tasks time stamped for the present day and present time from the one or more mobile tasks. For example, the user may time stamped today with the activity of "Go saloon". If such case, then the system proposes the route of "source-saloon-E-C-destination" in order to avoid traffic and complete the task.

Predict bursts of traffic (e.g—theater show timings— spike in vehicles leaving theater) to warn driver and advice on ideal start time Approaching Traffic and During Traffic Transit Time The system selects the one or more relevant tasks when the vehicle approaching the traffic from the various tasks obtained from the various unit such as the mobile interface unit, entertainment interface unit, content learning and aggregation unit and/or emotion sensing interface unit.

In one embodiment, the selection of the one or more relevant tasks includes

Estimating 302 the exact traffic transit time using the navigation unit 102

Retrieving 304 list of previous tasks from the content learning and aggregation unit 104 which are completed within the traffic transit time, Retrieving 306 list of tasks which are time stamped for the particular day +/−2 days, this is obtained from the mobile device 118A-B and/or entertainment device 120A-B Displaying 308 list of relevant tasks during the traffic transit time, the list of relevant tasks includes list of pervious tasks and list of tasks obtained in the above two steps. Further, the system displays the more optimum relevant tasks at the top Allowing 310 the user/driver to select and perform at least one of the tasks displayed in the display device.

Storing 312 the task details completed along with the time stamp and duration of time in the content learning and aggregation unit.

For example, the traffic transit time estimated as 10 mins, i. The system searches and identifies the list of previous tasks completed within 10 mins. In case if the tasks hits more than 100 (threshold), the system selects the list of previous tasks which are completed in recent days and applies the filter of itinerary information.

ii. The system also checks for the list of tasks which are time stamped for the predefined time period (+/−2 days of the particular day), iii. The system compares the list of mobile tasks obtained in step (ii) with the list of previous tasks obtained in the step (i) to obtain the matching tasks i.e. more optimum relevant tasks iv. The system displays list of relevant tasks in a defined order (which includes (a) list of optimum relevant tasks and followed by (b) list of tasks obtained in step ii and (c) list of tasks obtained in step i In one another embodiment, the selection of the one or more relevant tasks includes Estimating 402 the exact traffic transit time using the navigation unit 102

Retrieving 404 list of previous tasks from the content learning and aggregation unit 104 which are completed within the traffic transit time, Retrieving 406 list of tasks which are time stamped for the particular day +/−2 days, this is obtained from the mobile device 118A-B and/or entertainment device 120A-B Sensing emotion of the user using emotion sensing device 122A-B Retrieving 408 list of tasks which are tagged for the sensed emotion from the entertainment device 120A-B Adapting the atmosphere of a vehicle by controlling at least one parameter such as air, temperature based on the sensed emotion Displaying 410 list of relevant tasks during the traffic transit time, the list of relevant tasks includes list of pervious tasks and list of tasks obtained in the above two steps. Further, the system displays the more optimum relevant tasks at the top Allowing 412 the user/driver to select and perform at least one of the tasks displayed in the display device.

Storing the 414 task details completed along with the time stamp and duration of time in the content learning and aggregation unit.

For example, the traffic transit time estimated as 15 mins,
i. The system searches and identifies the list of previous tasks completed within 15 mins. In case if the tasks hits more than 100 (threshold), the system selects the list of previous tasks which are completed in recent days and applies the filter of itinerary information.
ii. The system also checks for the list of tasks which are time stamped for the predefined time period (+/−2 days of the particular day),
iii. The system also checks for the list of tasks which are tagged with presently sensed emotion,
iv. The system compares the list of tasks obtained in step (i), (ii) and (iii) in order to obtain the matching tasks i.e. more optimum relevant tasks
v. The system displays list of relevant tasks in a defined order which includes (a) list of optimum relevant tasks and followed by (b) list of tasks obtained in step iii, step ii and step i Passed Traffic
  Provide data/interactive graphs for analysis. (Works in sync with mobile app interface)
  Show driving style/efficiency inferences based on vehicle utilization—amount spent in traffic and comparison over route/time to know optimal days etc Drive Assist
  While driving on highway—speed/driving advisory w.r.t traffic predicted enroute and relative speed of vehicles around such that minimal overtakes and optimum speed for fuel efficiency Non-Autonomous Cars
  Driver can access content and perform activities which are otherwise disabled while driving
  Driver is given information related to traffic cause, traffic duration and impact on his itinerary to alleviate anxiety—a root cause for rash driving Semi-Autonomous Cars
  The above discussed concept can also be extended to semi-autonomous cars as one of the triggers for switching to the autonomous mode—e.g—while approaching traffic show driver suggestions for activities and enter autonomous mode of driving. The exit criteria could be either clearance of traffic or completion of task started by the driver—whichever takes longer.

The embodiments herein and various units/module can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system, for the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An infotainment system for recommending one or more relevant tasks to a user during a traffic transit time comprising:
  a non-transitory computer readable medium for storing instructions for performing the recommending;
  a processor to perform the instructions, the processor being configured to:
  recieve itinerary information from said user for obtaining a real time traffic information for said itinerary information, wherein said itinerary information comprises a source and a destination;
  store a plurality of previous tasks performed by said user, a time period taken by said user to complete each of said plurality of previous tasks, and said itinerary information associated therewith;
  obtain a plurality of mobile tasks along with a time stamp for each of said plurality of mobile tasks from a plurality of mobile devices;
  detect an emotion of said user from an emotion sensing device;
  obtain a plurality of entertainment related tasks form an entertainment device, wherein each of said plurality of entertainment related tasks is tagged with at least one of said time stamp and said emotion;
  select said one or more relevant tasks when a vehicle is approaching a traffic from at least one of (i) said plurality of mobile tasks, (ii) said plurality of entertainment related tasks and (iii) said plurality of previous tasks based on (a) said real time traffic information and at least one of (b) said itinerary information, (c) said time stamp and (d) said emotion of said user; and
  display said task during said traffic transit time and allowing said user to perform said task.

2. The system as claimed in claim 1, wherein said mobile device is defined as at least one of a mobile phone, a laptop, a tablet computer.

3. The system as claimed in claim 1, wherein said emotion sensing device is defined as a device worn by said user or an image capturing device.

4. The system as claimed in claim 1, wherein said entertainment device is at least one of (i) a media player and (ii) a game player, and said entertainment device storing said plurality entertainment related tasks along with said time stamp and said emotion.

5. The system as claimed in claim 1, wherein the processor being configured to select is further configured to:
   (a) identify an exact traffic transit time from said real time traffic information and (b) select one or more relevant tasks from said plurality of tasks that are suitable for said exact traffic transit time, wherein said selecting of one or more relevant tasks comprises:
   (i) searching for said one or more relevant tasks from said plurality of previous task which are completed in a duration of said exact traffic transit time;
   (ii) searching for said one or more relevant tasks from said plurality of mobile tasks which are time stamped for a predefined duration;
   (iii) searching for said one or more relevant tasks from said plurality of entertainment related tasks based on at least one of said time stamp for a present time and said emotion sensed in said emotion sensing unit.

6. The system as claimed in claim 1, wherein the processor is further configured to control an environmental condition inside a vehicle based on said emotion.

7. A method for recommending one or more relevant tasks to an user during a traffic transit time, comprising:
   receiving an itinerary information which comprises a source and destination from said user;
   receiving a real time traffic information from a navigation unit for said itinerary information;
   obtaining a plurality mobile tasks and a time stamp associated to each of said plurality of mobile tasks from a mobile device;
   obtaining a plurality of previous tasks by said user, a time period taken by said user to complete each of said plurality of previous tasks, and said itinerary information associated therewith from a content learning and aggregation unit;
   obtaining a plurality of entertainment related tasks along with said time stamp for each of said plurality of entertainment related tasks from an entertainment device;
   selecting said one or more relevant tasks when a vehicle is approaching the traffic from at least one of (i) said plurality of previous tasks, (ii) said plurality of mobile tasks, and (iii) said plurality of entertainment tasks based on (a) said real time traffic information, (b) said itinerary information and (c) said time stamp; and
   displaying said one or more relevant tasks to said user during said traffic transit time in a display and allowing said user to perform said relevant task.

8. The method as claimed in claim 7, wherein said selecting comprises:
   estimating an exact traffic transit time from said real time traffic information obtained from said navigation unit;
   searching for first relevant tasks from said plurality of previous tasks which are completed in duration of said exact traffic transit time;
   searching for second relevant tasks from at least one of said plurality of mobile tasks and said plurality entertainment related tasks which are time stamped for a predefined duration;
   displaying said one or more relevant tasks which comprises said first relevant tasks and second relevant tasks;
   performing a relevant task from one or more relevant tasks by said user; and storing said one or more relevant tasks performed by said user along with a time period taken for completing said task and said itinerary information in said content learning and aggregation unit.

9. The method as claimed in claim 7, further comprising:
   obtaining an emotion of said user, wherein said plurality of entertainment related tasks is tagged with one or more emotions.

10. The method as claimed in claim 9, wherein said selecting comprises:
    estimating an exact traffic transit time from said real time traffic information;
    searching for first relevant tasks from said plurality of previous tasks which are completed in duration of said exact traffic transit time;
    searching for second relevant tasks from at least one of said plurality of mobile tasks and said plurality entertainment related tasks which are time stamped for a predefined duration;
    searching for third relevant tasks from said plurality of entertainment related tasks which are tagged with said emotion;
    displaying said one or more relevant tasks which comprises said first relevant tasks, said second relevant tasks and third relevant tasks in a display device;
    performing at least one or more relevant tasks by said user; and storing said one or more relevant tasks performed by said user along with a time period taken for completing said task and said itinerary information.

11. A non-transitory computer-readable medium encoded with instructions that, when executed in hardware, perform a process for recommending one or more relevant tasks to an user during a traffic transit time, the process comprising:
    receiving an itinerary information which comprises a source and destination from said user;
    receiving a real time traffic information from a navigation unit for said itinerary information;
    obtaining a plurality mobile tasks and a time stamp associated to each of said plurality of mobile tasks from a mobile device;
    obtaining a plurality of previous tasks by said user, a time period taken by said user to complete each of said plurality of previous tasks, and said itinerary information associated therewith from a content learning and aggregation unit;
    obtaining a plurality of entertainment related tasks along with said time stamp for each of said plurality of entertainment related tasks from an entertainment device;
    selecting said one or more relevant tasks when a vehicle is approaching the traffic from at least one of (i) said plurality of previous tasks, (ii) said plurality of mobile tasks, and (iii) said plurality of entertainment tasks based on (a) said real time traffic information, (b) said itinerary information and (c) said time stamp; and
    displaying said one or more relevant tasks to said user during said traffic transit time in a display and allowing said user to perform said relevant task.

12. The non-transitory computer-readable medium as claimed in claim 11, wherein said selecting comprises:
    estimating an exact traffic transit time from said real time traffic information obtained from said navigation unit;
    searching for first relevant tasks from said plurality of previous tasks which are completed in duration of said exact traffic transit time;
    searching for second relevant tasks from at least one of said plurality of mobile tasks and said plurality entertainment related tasks which are time stamped for a predefined duration;

displaying said one or more relevant tasks which comprises said first relevant tasks and second relevant tasks;

performing a relevant task from one or more relevant tasks by said user; and storing said one or more relevant tasks performed by said user along with a time period taken for completing said task and said itinerary information in said content learning and aggregation unit.

13. The non-transitory computer-readable medium as claimed in claim 11, the process further comprising:

obtaining an emotion of said user, wherein said plurality of entertainment related tasks is tagged with one or more emotions.

14. The non-transitory computer-readable medium as claimed in claim 13, wherein said selecting comprises:

estimating an exact traffic transit time from said real time traffic information;

searching for first relevant tasks from said plurality of previous tasks which are completed in duration of said exact traffic transit time;

searching for second relevant tasks from at least one of said plurality of mobile tasks and said plurality entertainment related tasks which are time stamped for a predefined duration;

searching for third relevant tasks from said plurality of entertainment related tasks which are tagged with said emotion;

displaying said one or more relevant tasks which comprises said first relevant tasks, said second relevant tasks and third relevant tasks in a display device;

performing at least one or more relevant tasks by said user; and storing said one or more relevant tasks performed by said user along with a time period taken for completing said task and said itinerary information.

15. The system as claimed in claim 1, wherein the processor is further configured to switch autonomous mode based on (a) said real time traffic information and at least one of (b) said itinerary information, (c) said time stamp and (d) said emotion of said user.

* * * * *

UNITED STATES PATENT AND TRADEMARK OFFICE
CERTIFICATE OF CORRECTION

PATENT NO. : 10,228,260 B2
APPLICATION NO. : 15/541304
DATED : March 12, 2019
INVENTOR(S) : Ganesan Swaminathan et al.

Page 1 of 1

It is certified that error appears in the above-identified patent and that said Letters Patent is hereby corrected as shown below:

On the Title Page

(72) Inventors should read: Ganesan Swaminathan, Chennai (IN);
Ashokkumar Vasarla, Chennai (IN);
Vijaya Ramanujam, Chennai (IN);
Venkatasubramanian Saminathan, Chennai (IN)

Signed and Sealed this
Thirty-first Day of March, 2020

Andrei Iancu
*Director of the United States Patent and Trademark Office*